US010731856B2

(12) United States Patent
Kim

(10) Patent No.: US 10,731,856 B2
(45) Date of Patent: Aug. 4, 2020

(54) DUCT ASSEMBLY INCLUDING HELICOIDAL STRUCTURE AND GAS TURBINE COMBUSTOR INCLUDING THE SAME

(71) Applicant: DOOSAN HEAVY INDUSTRIES & CONSTRUCTION CO., LTD., Changwon-si, Gyeongsangnam-do (KR)

(72) Inventor: Geun Cheol Kim, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 119 days.

(21) Appl. No.: 16/111,245

(22) Filed: Aug. 24, 2018

(65) Prior Publication Data

US 2019/0086083 A1    Mar. 21, 2019

(30) Foreign Application Priority Data

Sep. 15, 2017   (KR) .......................... 10-2017-0118786

(51) Int. Cl.
*F23R 3/00* (2006.01)
*F23R 3/04* (2006.01)
(Continued)

(52) U.S. Cl.
CPC .............. *F23R 3/002* (2013.01); *F23R 3/005* (2013.01); *F23R 3/04* (2013.01); *F23R 3/12* (2013.01);
(Continued)

(58) Field of Classification Search
CPC .......... F01D 9/023; F01D 25/26; F23R 3/002; F23R 2900/03042; F23R 2900/03043; F02C 7/18
See application file for complete search history.

(56) References Cited

U.S. PATENT DOCUMENTS

| 8,453,460 | B2 | 6/2013 | Dugar et al. |
| 8,959,886 | B2 | 2/2015 | Lee et al. |

(Continued)

FOREIGN PATENT DOCUMENTS

| EP | 2204614 A2 | 7/2010 |
| JP | 10082527 A | 3/1998 |

(Continued)

OTHER PUBLICATIONS

An European Search Report dated Nov. 22, 2018 in connection with European Patent Application No. 18190356.8 which corresponds to the above-referenced U.S. application.

(Continued)

*Primary Examiner* — Todd E Manahan
*Assistant Examiner* — Katheryn A Malatek
(74) *Attorney, Agent, or Firm* — Invenstone Patent, LLC

(57) ABSTRACT

A helicoidal structure promotes cooling of a liner applied in an annular space of a double-shell structure formed of the liner and a flow sleeve to cool a duct assembly, by increasing the residence time and cooling area of cooling compressed air on the surface of the liner. The helicoidal structure includes a helicoidal rib protruding from a surface of the liner to guide the cooling compressed air at a predetermined angle with respect to an axial direction of the liner, the helicoidal rib having cooling holes and forming a first cooling passage along which main-cooling compressed air flows and a second cooling passage along which auxiliary-cooling compressed air flows. The second cooling passage induces a flow of the auxiliary-cooling compressed air through the cooling holes, and the flow of the auxiliary-cooling compressed air is derived from a flow of the main-cooling compressed air in the first cooling passage.

20 Claims, 9 Drawing Sheets

(51) Int. Cl.
  *F23R 3/44* (2006.01)
  *F23R 3/12* (2006.01)
  *F01D 25/26* (2006.01)
  *F28F 1/10* (2006.01)
  *F28F 1/36* (2006.01)
  *F28D 7/10* (2006.01)
  *F16L 9/18* (2006.01)
  *F01D 9/02* (2006.01)

(52) U.S. Cl.
  CPC ............... *F23R 3/44* (2013.01); *F01D 9/023* (2013.01); *F01D 25/26* (2013.01); *F05D 2220/32* (2013.01); *F05D 2240/35* (2013.01); *F05D 2250/25* (2013.01); *F16L 9/18* (2013.01); *F23R 2900/03042* (2013.01); *F23R 2900/03043* (2013.01); *F23R 2900/03045* (2013.01); *F28D 7/10* (2013.01); *F28F 1/10* (2013.01); *F28F 1/36* (2013.01)

(56) References Cited

U.S. PATENT DOCUMENTS

| | | | |
|---|---|---|---|
| 9,528,701 | B2 | 12/2016 | Hughes |
| 2005/0044857 | A1* | 3/2005 | Glezer .................... F23R 3/002 60/772 |
| 2010/0005803 | A1* | 1/2010 | Tu ........................... F01D 9/023 60/752 |
| 2011/0247341 | A1 | 10/2011 | McMahan et al. |
| 2013/0167543 | A1 | 7/2013 | McMahan |

FOREIGN PATENT DOCUMENTS

| | | | | |
|---|---|---|---|---|
| JP | 2003307396 | A | * 10/2003 | ............... F28F 1/36 |
| JP | 2014052178 | A | 3/2014 | |
| JP | 2014070892 | A | 4/2014 | |
| JP | 5993122 | B2 | 9/2016 | |
| KR | 101309312 | B1 | * 9/2013 | |
| KR | 101309312 | B1 | 9/2013 | |

OTHER PUBLICATIONS

Korean Office Action issued by the Korean Intellectual Property Office dated Jan. 19, 2018 in connection with Korean Patent Application No. 10-2017-0118786.

\* cited by examiner

[FIG. 1]
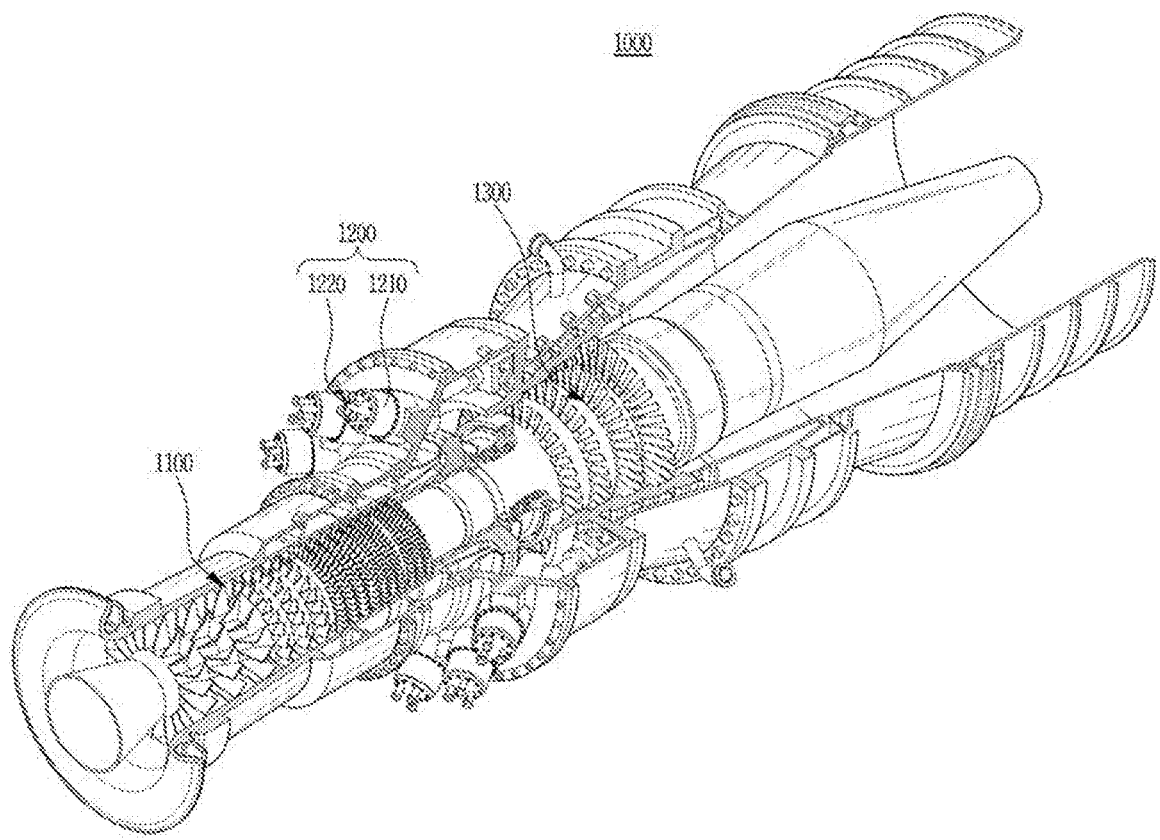

【FIG. 2】
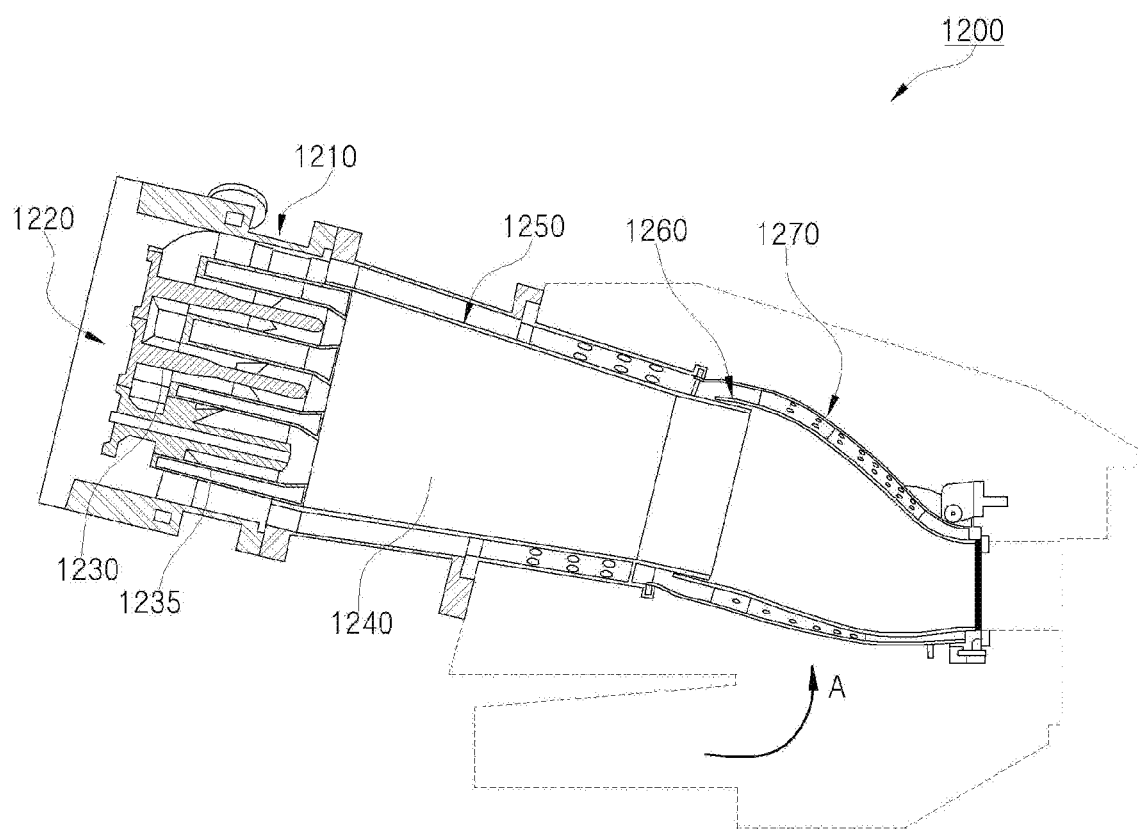

【FIG. 3】
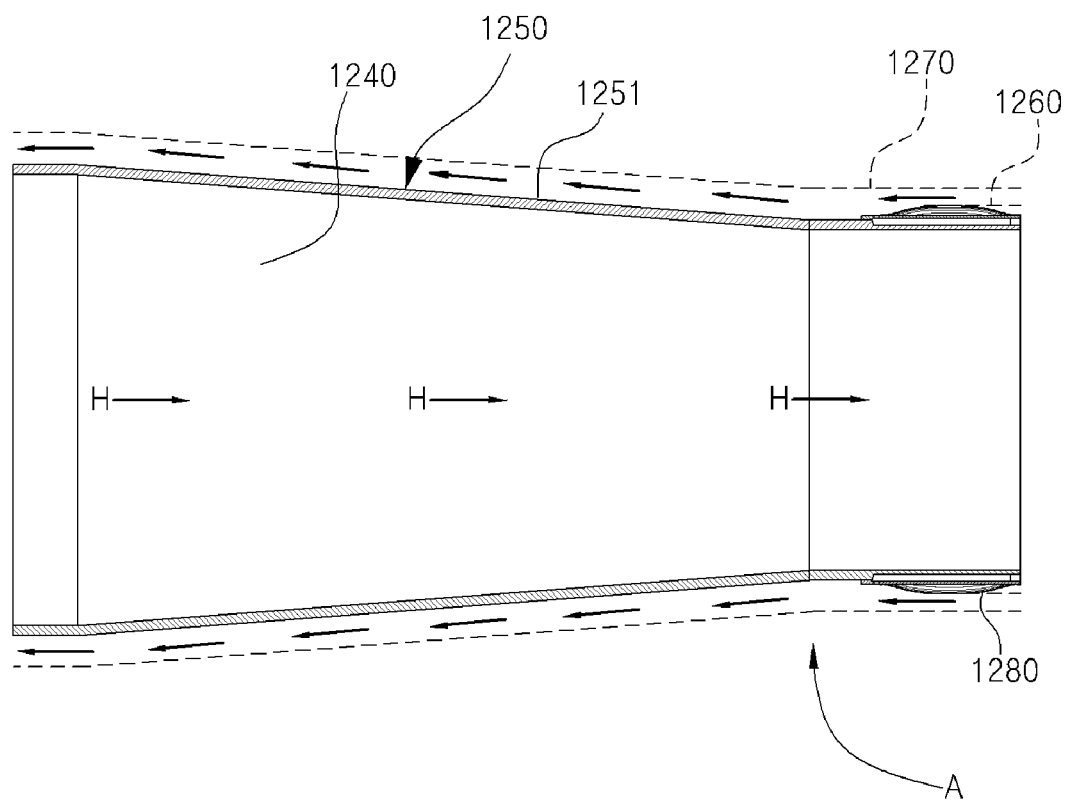
Related Art

[FIG. 4]
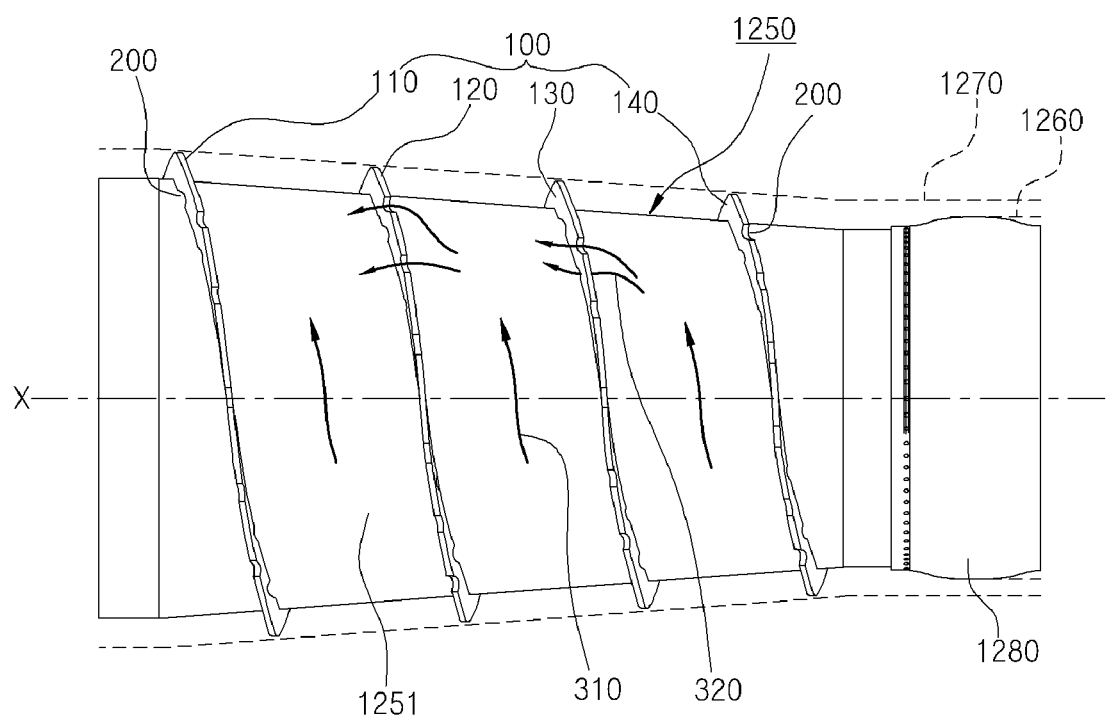

[FIG. 5]
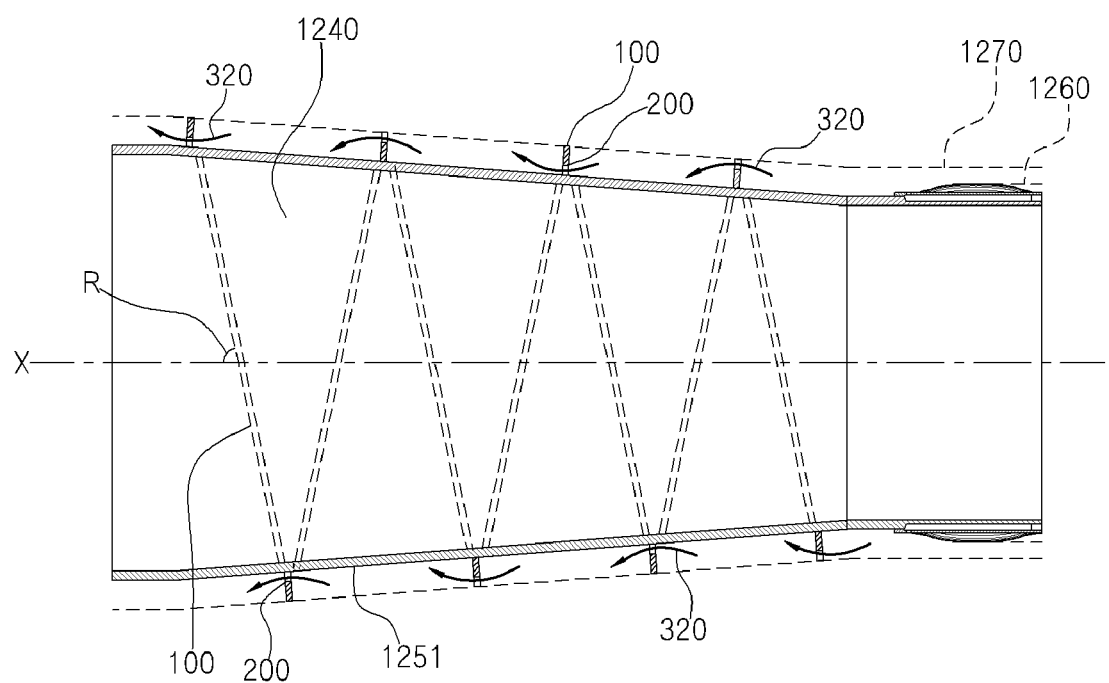

[FIG. 6]
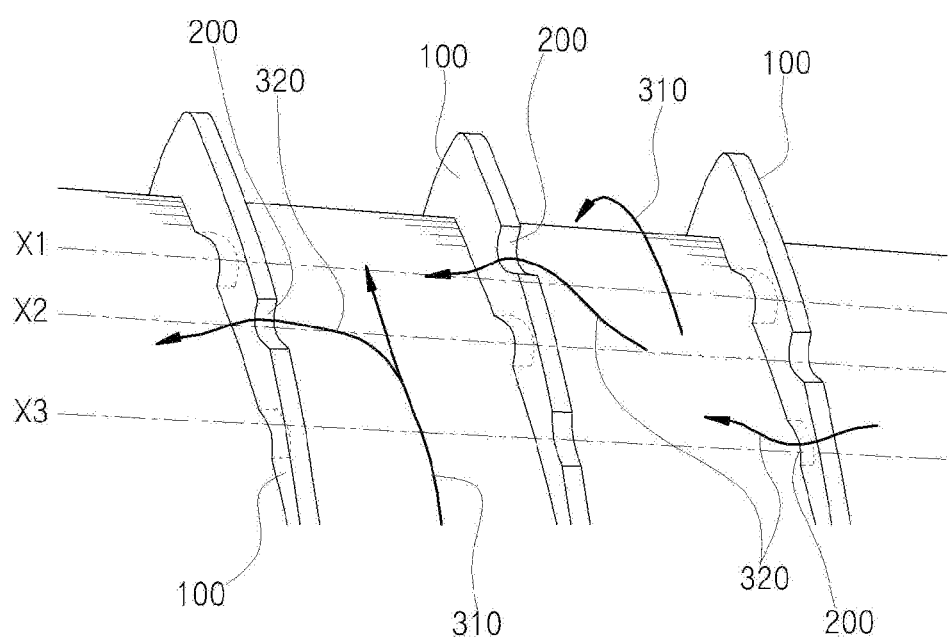

[FIG. 7]
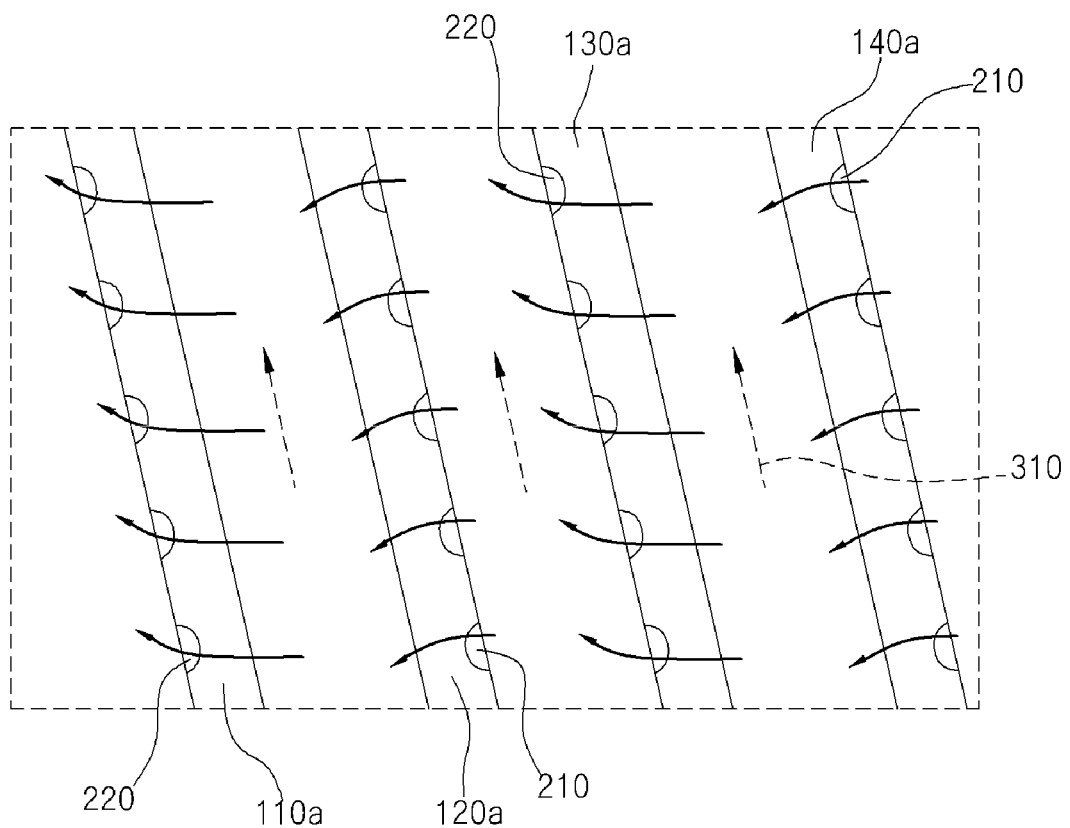

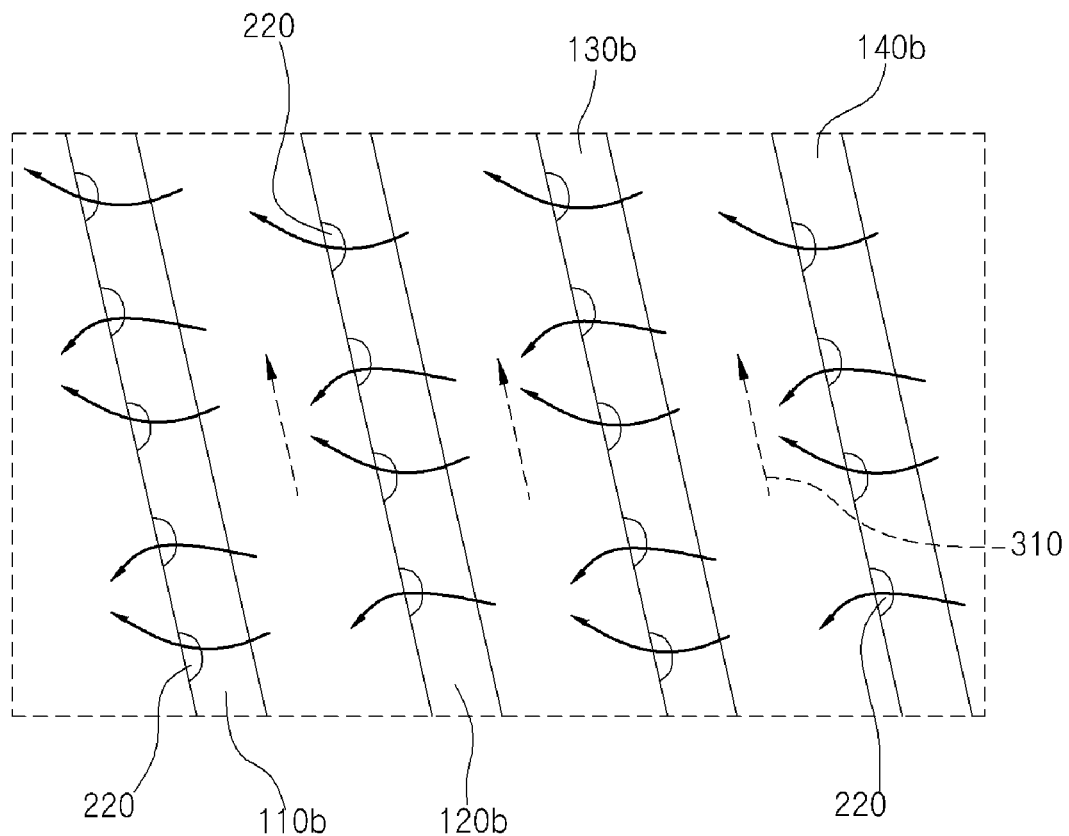
[FIG. 8]

[FIG. 9]
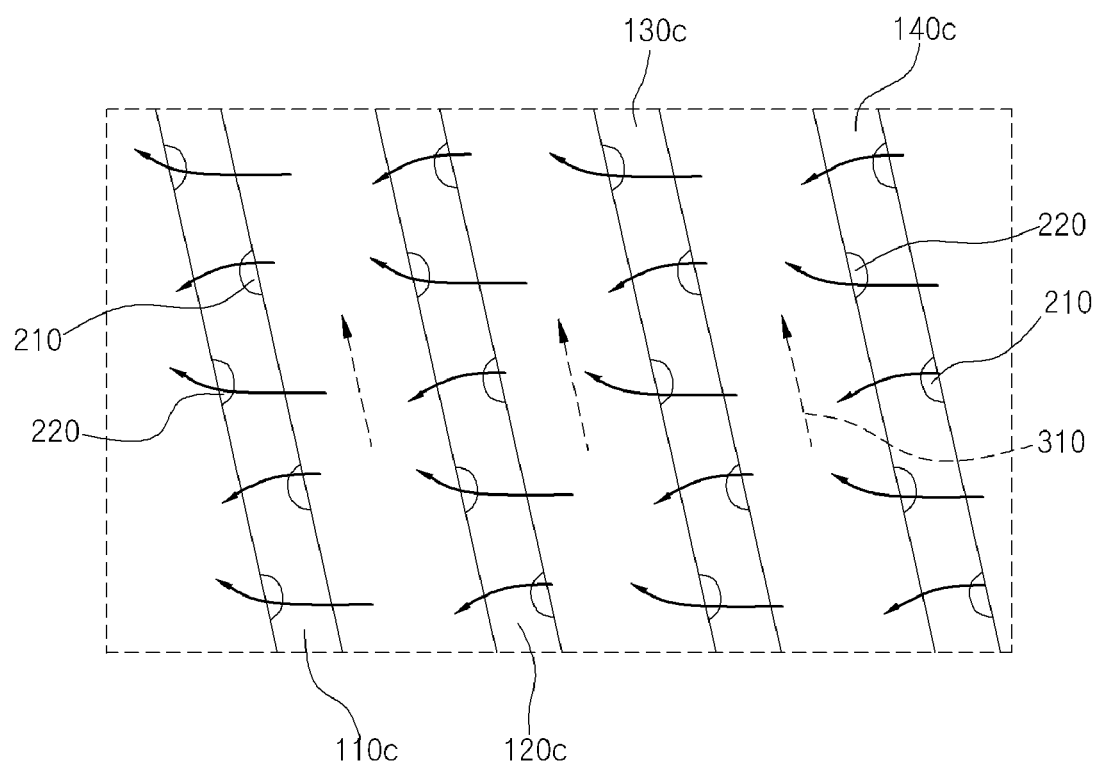

DUCT ASSEMBLY INCLUDING HELICOIDAL STRUCTURE AND GAS TURBINE COMBUSTOR INCLUDING THE SAME

CROSS-REFERENCE TO RELATED APPLICATIONS

This application claims priority to Korean Patent Application No. 10-2017-0118786, filed on Sep. 15, 2017, the disclosure of which is incorporated herein by reference in its entirety.

BACKGROUND OF THE DISCLOSURE

Field of the Disclosure

Exemplary embodiments of the present disclosure relate to a gas turbine, and more particularly, to a duct assembly structure for promoting film cooling of a liner applied to a gas turbine combustor.

Description of the Related Art

A combustor for gas turbines is provided between a compressor and a turbine, and functions to mix fuel with compressed air supplied from the compressor, combust the mixture through an isobaric process to produce combustion gas having high energy, and transmit the combustion gas to the turbine which converts thermal energy of the combustion gas into mechanical energy.

The combustor is provided with a duct assembly including a transition piece which comes into direct contact with high-temperature combustion gas, a flow sleeve which encloses the transition piece, and so forth. It is essential for the transition piece and related components to be appropriately cooled. To this end, the combustor is configured such that some of compressed air (A) flowing out of the compressor is supplied into an internal annular space through an inlet hole of the flow sleeve so as to enhance the performance of cooling a liner (refer to FIG. 2).

Particularly, as ignition and combustion are performed in the liner, high-temperature combustion gas (H) flows in a downstream direction, such that the inner surface of the liner is continuously exposed to a high-temperature environment. Meanwhile, compressed air for film cooling flows upstream through the annular space enclosed by the liner and the flow sleeve (refer to FIG. 3).

However, according to the above structure for cooling the liner, the flow of compressed air introduced from the inlet hole of the flow sleeve has unidirectional characteristics, whereby the flow direction follows a line toward an upstream side of the combustor. Meanwhile, there is a limited amount of compressed air available, so that the unidirectional flow characteristics can achieve only limited cooling efficiency.

SUMMARY OF THE DISCLOSURE

An object of the present disclosure is to provide a helicoidal structure for promoting cooling of a liner capable of diversifying flow passage on a surface of the liner enclosed by a flow sleeve so that the residence time and cooling area of limited cooling compressed air on a liner surface can be increased, thus maximizing the cooling efficiency. Another object of the present disclosure is to provide a gas turbine combustor including the helicoidal structure.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

Embodiments of the present disclosure may provide a helicoidal structure for promoting cooling of a liner applied in an annular space of a double-shell structure formed of the liner and a flow sleeve to cool a duct assembly. The helicoidal structure may include a helicoidal rib configured to protrude from a surface of the liner to guide the cooling compressed air at a predetermined angle with respect to an axial direction of the liner, the helicoidal rib having cooling holes and forming a first cooling passage along which main-cooling compressed air flows and a second cooling passage along which auxiliary-cooling compressed air flows, wherein the second cooling passage induces a flow of the auxiliary-cooling compressed air through the cooling holes, and the flow of the auxiliary-cooling compressed air is derived from a flow of the main-cooling compressed air in the first cooling passage.

The second cooling passage may guide the flow of the auxiliary- cooling compressed air along the axial direction.

The helicoidal structure may further include an upper junction between a surface of the flow sleeve and an upper edge of the helicoidal rib; and a lower junction between the surface of the liner and a lower edge of the helicoidal rib, and the cooling holes may be alternately formed in the upper and lower edges of the helicoidal rib along the axial direction.

The cooling holes may be formed at misaligned positions in respective portions of the helicoidal rib with respect to the axial direction such that second cooling passages intersect with each other along the axial direction.

The cooling holes may be formed at positions spaced apart from each other by a predetermined distance along the helicoidal rib.

The helicoidal rib may be formed with constant width and height and formed to coil the surface of the liner at least two times, so that the second cooling passage passes through the helicoidal rib at least two times.

Each of the cooling holes may have a semi-circular shape.

According to another aspect of the present disclosure, there is provided a combustor for a gas turbine. The combustor may include a transition piece; a liner coupled with the transition piece by an elastic support unit; a flow sleeve configured to enclose a periphery of the transition piece and the liner; and the above helicoidal rib.

According to another aspect of the present disclosure, there is provided a gas turbine for generating power. The gas turbine may include the above combustor.

It is to be understood that both the foregoing general description and the following detailed description of the present disclosure are exemplary and explanatory and are intended to provide further explanation of the disclosure as claimed.

As a helicoidal structure for promoting cooling of a liner according to the present disclosure is applied to a duct assembly and a gas turbine combustor including the duct assembly, a cooling passage along which limited compressed air supplied from a compressor of a gas turbine flows can be diversified so that generation of vortex currents capable of promoting the cooling of the surface of the liner can be maximized.

Various flow patterns are created, including separation, collision, and recombination. Particularly, a first cooling passage is induced using a helicoidal rib formed on the surface of the liner, and a second cooling passage is induced using a cooling hole. Thus, the residence time and cooling area of cooling compressed air on the surface of the liner can be increased.

The effects of the present disclosure are not limited to the above-stated effects, and those skilled in the art will clearly understand other not mentioned effects from the accompanying claims.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cutaway perspective view of the overall structure of a gas turbine including a combustor, to which may be applied a helicoidal structure according to the present disclosure;

FIG. 2 is a sectional view of a combustor for a gas turbine, to which may be applied a helicoidal structure for promoting cooling of a liner in accordance with the present disclosure;

FIG. 3 is a side view of a duct assembly including a liner and a flow sleeve enclosing the liner, in which a flow of compressed air for cooling exhibits conventional unidirectional flow characteristics;

FIG. 4 is a side view of a helicoidal structure for promoting cooling of a liner, in accordance with an embodiment of the present disclosure;

FIG. 5 is a cross-sectional view of the helicoidal structure of FIG. 4;

FIG. 6 is a perspective view of the helicoidal structure of FIG. 4; and

FIGS. 7-9 are plan views of the helicoidal ribs laying across a surface of the liner of the structure of FIG. 4, respectively illustrating first to third embodiments of the helicoidal structure in accordance with the present disclosure.

DESCRIPTION OF SPECIFIC EMBODIMENTS

Terms or words used hereinafter should not be construed as having common or dictionary meanings, but should be construed as having meanings and concepts that comply with the technical spirit of the present disclosure on the basis of the principle that the inventor may appropriately define the concepts of the terms in order to best describe his or her disclosure. Accordingly, the following description and drawings illustrate exemplary embodiments of the present disclosure and do not fully represent the scope of the present disclosure. It would be understood by one of ordinary skill in the art that a variety of equivalents and modifications of the embodiments exist.

Embodiments of the present disclosure are described in detail below with reference to the accompanying drawings.

In the drawings, the width, length, thickness, etc. of each element may have been enlarged for convenience. Furthermore, when it is described that one element is disposed 'over' or 'on' the other element, one element may be disposed 'right over' or 'right on' the other element or a third element may be disposed between the two elements. The same reference numbers are used throughout the specification to refer to the same or like parts.

Furthermore, the terms "first", "second", "A", "B", "(a)", "(b)", etc. may be used herein to describe various components of the embodiments of the present disclosure. These terms are only used to distinguish each component from another component, and do not limit the characteristics, turns, or sequences of the corresponding components. It is also noted that in this specification, "connected/coupled" refers to one component not only directly coupling another component but also indirectly coupling another component through an intermediate component.

The thermodynamic cycle of a gas turbine ideally complies with the Brayton cycle. The Brayton cycle consists of four processes including an isentropic compression (adiabatic compression) process, an isobaric heat supply process, an isentropic expansion (adiabatic expansion) process, and an isobaric heat rejection process. In other words, the gas turbine draws air from the atmosphere, compresses the air, combusts fuel under isobaric conditions to emit energy, expands this high- temperature combustion gas to convert the thermal energy of the combustion gas into kinetic energy, and thereafter discharges exhaust gas with residual energy to the atmosphere. As such, the Brayton cycle consists of four processes including compression, heat addition, expansion, and heat rejection.

Embodying the Brayton cycle, the gas turbine includes a compressor, a combustor, and a turbine. FIG. 1 illustrates the overall configuration of a gas turbine 1000. Although the following description will be made with reference to FIG. 1, the description of the present disclosure may also be widely applied to a turbine engine having the same or similar configuration as that of the gas turbine 1000.

A compressor 1100 of the gas turbine 1000 is a part functioning to draw air and compress the air. A main function of the compressor 1100 is to supply air for combustion to the combustor 1200 and supply air for cooling to a high-temperature region of the gas turbine 1000 which is required to be cooled. Drawn air is compressed in the compressor 1100 through an adiabatic compression process, so that the pressure and the temperature of air passing through the compressor 1100 are increased. The compressor 1100 in a large gas turbine such as the gas turbine 1000 shown in FIG. 1 is configured of a multi-stage axial compressor, so that a large amount of air can be compressed to a target compression ratio while passing through the multiple stages.

The combustor 1200 functions to mix fuel with compressed air supplied from an outlet of the compressor 1100 and combust the mixture through an isobaric combustion process to make combustion gas having high energy. FIG. 2 illustrates an example of the combustor 1200 provided in the gas turbine 1000, whereby a limited amount of compressed air for cooling flows into the duct assembly. The combustor 1200 is disposed at a downstream side of the compressor 1100 and includes a plurality of burners 1220 disposed along a combustor casing 1210 having an annular shape. A plurality of combustion nozzles 1230 are provided in each burner 1220. Fuel ejected from the combustion nozzles 1230 is mixed with air at an appropriate ratio to produce a mixture having conditions suitable for combustion.

The fuel utilized by the gas turbine 1000 may include a gas fuel, a liquid fuel, or a hybrid fuel formed by a combination of these. It is important to form combustion conditions for reducing the amount of exhaust gas such as carbon monoxide and nitrogen oxide, which may be subject to regulation. Recently, use of pre-mixed combustion has increased because a combustion temperature can be reduced and uniform combustion is possible so that exhaust gas can be reduced, although it is difficult to control pre-mixed combustion.

In the case of the pre-mixed combustion, compressed air is mixed with fuel ejected from the combustion nozzles 1230 before entering the combustion chamber 1240. Initial ignition of pre-mixed gas is performed by an igniter. Thereafter, if combustion is stabilized, the combustion is maintained by supplying fuel and air.

There is a need to appropriately cool the combustor 1200, which is the highest temperature environment in the gas turbine 1000. Particularly, a turbine inlet temperature (TIT) is a critical factor in the operation of the gas turbine 1000, because turbine efficiency increases as the TIT increases. Furthermore, the higher the TIT, the more advantageous it is for gas turbine combined power generation. For this reason, the gas turbine 1000 may be classified (graded) based on the TIT.

To increase the TIT, the temperature of combustion gas should ultimately be increased. Therefore, it is important for both the combustion chamber 1240 of the combustor 1200, through which high-temperature combustion gas flows, and a duct assembly for forming a flow passage not only to be made of material having high thermal resistance but also to be designed such that they can be satisfactorily cooled. The duct assembly is coupled between the burner 1220 and the turbine 1300 and carries high-temperature combustion gas.

Referring to FIG. 2, the duct assembly is formed of a liner 1250, a transition piece 1260, and a flow sleeve 1270. Compressed air flows along an interior surface of the duct assembly and then is supplied toward the combustion nozzles 1230. During this process, the duct assembly, which is heated by high-temperature combustion gas, can be appropriately cooled.

The duct assembly has a double-shell structure, in which the flow sleeve 1270 encloses the outer surfaces of the liner 1250 and the transition piece 1260 that are coupled to each other by an elastic support 1280. Compressed air enters an annular space defined in the flow sleeve 1270 and cools the liner 1250 and the transition piece 1260.

The liner 1250 is a tube member coupled to the burner 1220 of the combustor 1200, and an internal space of the liner 1250 forms the combustion chamber 1240. The transition piece 1260 coupled with the liner 1250 is coupled to an inlet of the turbine 1300 and functions to guide high-temperature combustion gas into the turbine 1300. The flow sleeve 1270 functions to protect the liner 1250 and the transition piece 1260 and to prevent high-temperature heat from escaping the combustion chamber 1240 and being emitted to the outside.

Particularly, because the liner 1250 and the transition piece 1260 come into direct contact with high-temperature combustion gas, it is essential to appropriately cool the liner 1250 and the transition piece 1260. Basically, the liner 1250 and the transition piece 1260 are protected from high-temperature combustion gas in a film cooling manner using compressed air. For example, as shown in FIG. 2, a complex double-shell structure may be used to enhance the film cooling effect by introducing compressed air directly onto outer circumferential surfaces of the liner 1250 and the transition piece 1260.

Furthermore, because one end of the liner 1250 and one end of the transition piece 1260 are respectively fixed to the combustor 1200 and the turbine 1300, the elastic support 1280 should have a structure capable of absorbing length and diameter extension due to thermal expansion so as to reliably support the liner 1250 and the transition piece 1260.

High-temperature and high-pressure combustion gas generated from the combustor 1200 is supplied to the turbine 1300 through the duct assembly. In the turbine 1300, combustion gas expands through an adiabatic expansion process and collides with a plurality of blades radially disposed on the shaft of the turbine 1300 so that reaction force is applied to the blades. Thus, thermal energy of the combustion gas is converted into mechanical energy by which the shaft is rotated. Some of the mechanical energy obtained in the turbine 1300 is supplied as energy needed to compress air in the compressor, and the remaining mechanical energy is used as valid energy for driving a generator to produce electric power, or the like.

In the gas turbine 1000, major components do not reciprocate. Hence, mutual friction parts such as a piston-and-cylinder are not present, so that there are advantages in that there is little consumption of lubricant, the amplitude of vibration is markedly reduced unlike a reciprocating machine having high-amplitude characteristics, and high-speed driving is possible.

Furthermore, as the compression ratio at which air is compressed is increased and the temperature (TIT) of combustion gas drawn into the turbine through an isentropic expansion process is increased, as described above, the thermal efficiency in the Brayton cycle increases. Therefore, the gas turbine 1000 has been developed in such a way as to increase the compression ratio and the temperature at the inlet of the turbine 1300.

Hereinafter, the helicoidal structure for promoting the cooling of the liner according to the present disclosure that is applied to the combustor 1200 and the duct assembly of the gas turbine 1000 will be described in detail with reference to FIGS. 4 to 9.

FIG. 4 illustrates the overall configuration of the helicoidal structure for promoting the cooling of the liner, in accordance with an embodiment of the present disclosure, and FIGS. 5 and 6 are views of the helicoidal structure of FIG. 4 to explain cooling passages according to the present disclosure.

The present disclosure relates to the helicoidal structure for promoting the cooling of the liner that can be applied to the combustor 1200 of the gas turbine.

The combustor 1200 includes the duct assembly. The duct assembly includes the transition piece 1260, the liner 1250 coupled with the transition piece 1260 by the elastic support 1280, and the flow sleeve 1270 that encloses the periphery of the transition piece 1270 and the liner 1250. The present disclosure relates to a liner cooling structure applied to an annular space of a double-shell structure configured of the flow sleeve 1270 and a front liner 1251 corresponding to a front end of the duct assembly.

To achieve the maximum cooling efficiency using limited compressed air by improving the unidirectional flow of cooling compressed air, the flow of cooling compressed air toward the upstream side (leftward in FIG. 4) in the present disclosure is formed by a first cooling passage 310 and a second cooling passage 320.

In detail, the first cooling passage 310 is formed to guide the cooling compressed air at a predetermined angle R based on an axial direction X by a helicoidal rib 100 protruding from the surface of the liner 1251. In this way, the first cooling passage 310 may form a main flow of cooling compressed air that takes up most (at least 70%) of the cooling compressed air that enters the annular space enclosed by the front liner 1251 and the flow sleeve 1270 and flows toward the upstream side.

The helicoidal rib 100 protruding from the surface of the liner 1251 is disposed in the annular space enclosed by the front liner 1251 and the flow sleeve 1270. The helicoidal rib 100 may be joined to both the front liner 1251 and the flow sleeve 1270. In other words, a lower junction may be formed on an outer circumferential surface of the front liner 1251 and, simultaneously, an upper junction may be formed on an inner circumferential surface of the flow sleeve 1270. The helicoidal rib 100 joined with both the front liner 1251 and the flow sleeve 1270 also functions to helicoidally uniformly support almost the entire axial length of the liner 1250 and the flow sleeve 1270 which are made of thin plates. By this structure, the helicoidal rib 100 may also function to restrain resonance or vibration which may be easily generated in the duct assembly, which is a kind of pipe.

In addition, the second cooling passage 320 is formed by providing cooling holes 200 in the helicoidal rib 100 so as to induce a separate compressed air flow derived from the flow of cooling compressed air formed along the first cooling passage 310. That is, of the cooling compressed air that enters the space enclosed by the front liner 1251 and the flow sleeve 1270 and flows upstream, a flow of auxiliary cooling compressed air may follow the second cooling passage 320.

Here, the second cooling passage 320 is formed such that some cooling compressed air is derived from the flow of cooling compressed air formed along the first cooling passage 310 and guided along the axial direction (X). Hence, in the present disclosure, based on the first cooling passage 310 that forms a helicoidal main flow and the second cooling passage 320 that forms an axial auxiliary flow, the second cooling passage 320 is guided to be separated or derived from the first cooling passage 310 or collided or joined with the first cooling passage 310 depending on arrangement of the helicoidal rib 100 and the cooling holes 200 (refer to FIG. 6). Eventually, the flow passage formed on the liner 1250 enclosed by the flow sleeve 1270 is diversified, whereby the residence time and cooling area of cooling compressed air on the surface of liner 1250 can be increased.

As such, to realize a three-dimensional shape of the cooling passage for maximizing the efficiency of cooling the liner, the arrangement of the helicoidal rib 100 and the cooling holes 200 on the surface of the liner may be embodied in various ways.

Hereinafter, various embodiments (refer to FIGS. 7 to 9) of the arrangement of the helicoidal rib 100 and the cooling holes 200 will be described based on the technical idea of the present disclosure.

FIG. 7 illustrates a first embodiment of the cooling passage in the helicoidal structure for promoting the cooling of the liner in accordance with the present disclosure.

Referring to FIG. 7, the cooling holes 200 may be alternately formed in upper and lower junction surfaces of the helicoidal rib 100 along the axial direction (X).

Since the helicoidal rib 100 is formed protruding in a helicoidal shape along the surface of the front liner 1251, the cooling holes 200 are repeatedly formed in a predetermined pattern along an arbitrary axial direction (refer to X1 to X3 of FIG. 6). As such, the helicoidal rib 100 passing repeatedly over the surface of the front liner 1251 may be referred to as first to fourth ribs 110, 120, 130, and 140 in a sequence from the upstream to downstream sides. The distance between two adjacent ribs may be changed depending on the angle R at which the helicoidal rib 100 is formed based on the axial direction (X).

Referring to this, in the first embodiment, the helicoidal rib 100 is formed with constant width and height and formed to coil the surface of the liner four times, so that the second cooling passage 320 passes through the helicoidal rib 100 along the axial direction (X) at least four times.

According to the first embodiment, the cooling holes 200 are formed in any one rib at positions spaced apart from each other by predetermined distances along the helicoidal direction. Each cooling hole 200 has a semi-circular shape. Cooling holes 220 may be formed in lower junction surfaces of the first rib 110*a* and the third rib 130*a*. Cooling holes 210 may be formed in upper junction surfaces of the second rib 120*a* and the fourth rib 140*a*.

Consequently, cooling compressed air along the second cooling passage 320 is guided to form a radial amplitude, whereby three-dimensional vortexes can be formed.

FIG. 8 illustrates a second embodiment of the cooling passage in the helicoidal structure for promoting the cooling of the liner in accordance with the present disclosure.

Referring to FIG. 8, the cooling holes 200 may be formed such that the second cooling passage 320 intersect with each other along the axial direction (X), in other words, may be formed at misaligned positions on the respective helicoidal ribs 100 such that the cooling holes 200 formed in the respective adjacent helicoidal ribs 100 do not overlap with each other along the axial direction (X).

In the second embodiment, in the same manner as the first embodiment, the helicoidal rib 100 is formed with constant width and height and formed to coil the surface of the liner four times, so that the second cooling passage 320 passes through the helicoidal rib 100 along the axial direction (X) at least four times. The cooling holes 200 are formed in any one rib at positions spaced apart from each other by predetermined distances along the helicoidal direction. Each cooling hole 200 has a semi-circular shape.

In the second embodiment, the cooling holes 220 are formed in lower junction surfaces of the first to fourth ribs 110*b* to 140*b*. Here, the cooling holes 220 are disposed such that the axial direction (X) along which the cooling holes 220 of the first and third ribs 110*b* and 130*b* are formed is misaligned from the axial direction (X) along which the cooling holes 220 of the second and fourth ribs 120*b* and 140*b* are formed.

Consequently, cooling compressed air along the second cooling passage 320 may be satisfactorily separated from and collided and combined with each other in the axial direction even without interference with the first cooling passage 310.

FIG. 9 illustrates a third embodiment of the cooling passage in the helicoidal structure for promoting the cooling of the liner in accordance with the present disclosure.

Referring to FIG. 9, the cooling holes 200 may be alternately formed in upper and lower junction surfaces of the helicoidal rib 100 along the helicoidal rib 100.

In the third embodiment, in the same manner as the first embodiment, the helicoidal rib 100 is formed with constant width and height and formed to coil the surface of the liner four times, so that the second cooling passage 320 passes through the helicoidal rib 100 along the axial direction (X) at least four times. The cooling holes 200 are formed in any one rib at positions spaced apart from each other by predetermined distances along the helicoidal direction. Each cooling hole 200 has a semi-circular shape.

According to the third embodiment, in all of the ribs 110*c*, 120*c*, 130*c*, and 140*c*, the cooling holes 210 formed in the upper junction surface and the cooling holes 220 formed in the lower junction surface are alternately formed along the helicoidal direction. In addition, the arrangement of the cooling holes 200 along the axial direction (X) is provided such that the cooling holes 200 are also alternately formed in the upper and lower junction surfaces.

As such, in the present disclosure, based on the first cooling passage 310 and the second cooling passage 320 that have different flow directions, depending on arrangement of the helicoidal rib 100 and the cooling holes, the second cooling passage 320 is inducted to be separated or derived from the first cooling passage 310 or to be collided or combined with the first cooling passage 310. Thus, the flow passage toward the upstream side of the front liner 1251 can be formed in a three-dimensional shape, so that the cooling performance of the limited compressed air for cooling can be maximized. It is sufficient if the foregoing purpose can be satisfied; therefore, the present is not limited to the first to third embodiments. For example, in the present disclosure, the cooling holes 200 may be alternately formed in the upper and lower junction surfaces of the helicoidal rib 100 along the axial direction (X) and, simultaneously, the cooling holes 200 may be formed at misaligned positions in the respective helicoidal ribs 100 such that the second cooling passage 320 is alternately formed along the axial direction (X).

As described above, as a helicoidal structure for promoting cooling of a liner according to the present disclosure is applied to a duct assembly and a gas turbine combustor including the duct assembly, a cooling passage along which limited compressed air supplied from a compressor of a gas turbine flows can be diversified so that generation of vortex currents capable of promoting the cooling of the surface of the liner can be maximized.

Particularly, various flow patterns such as separation, collision and combination are formed both by a first cooling passage induced using a helicoidal rib formed on the surface of the liner and by a second cooling passage induced using a cooling hole. Thus, the residence time and cooling area of cooling compressed air on the surface of the liner can be increased.

While the helicoidal structure for promoting cooling of the liner to enhance the performance of cooling the transition piece, and the gas turbine combustor including the helicoidal structure in accordance with the present disclosure have been described with respect to the specific embodiments, it will be apparent to those skilled in the art that various changes and modifications may be made without departing from the spirit and scope of the disclosure as defined in the following claims.

Therefore, it should be understood that the exemplary embodiments are only for illustrative purposes and do not limit the bounds of the present invention.

What is claimed is:

1. A helicoidal structure for promoting cooling of a liner applied in an annular space of a double-shell structure formed of the liner and a flow sleeve, the helicoidal structure comprising:
   a helicoidal rib including a continuous wall forming a first cooling passage along which main-cooling compressed air flows, the continuous wall comprising:
      an upper edge forming an upper junction with an inner circumferential surface of the flow sleeve,
      a lower edge forming a lower junction with an outer circumferential surface of the liner, and
      a plurality of cooling holes formed in at least one of the upper and lower edges of the continuous wall, each of the plurality of cooling holes extending only part way from one of the upper and lower edges to the other of the upper and lower edges,
   wherein the helicoidal rib is configured to guide the main-cooling compressed air at a predetermined angle with respect to an axial direction of the liner, and
   wherein the plurality of cooling holes form a second cooling passage extending in the axial direction, the second cooling passage inducing a flow of an he auxiliary-cooling compressed air through the plurality of cooling holes, the flow of the auxiliary-cooling compressed air is derived from a flow of the main-cooling compressed air in the first cooling passage.

2. The helicoidal structure according to claim 1, wherein the plurality of cooling holes are formed in each of the upper and lower edges of the continuous wall of the helicoidal rib.

3. The helicoidal structure according to claim 1, wherein the plurality of cooling holes are alternately formed in the upper and lower edges of the continuous wall of the helicoidal rib along the axial direction.

4. The helicoidal structure according to claim 2, wherein the plurality of cooling holes are formed at misaligned positions in respective portions of the continuous wall of the helicoidal rib with respect to the axial direction.

5. The helicoidal structure according to claim 1, wherein the plurality of cooling holes are formed at positions spaced apart from each other by a predetermined distance along the continuous wall of the helicoidal rib.

6. The helicoidal structure according to claim 5, wherein the plurality of cooling holes are alternately formed in the upper and lower edges of the continuous wall of the helicoidal rib along the axial direction.

7. The helicoidal structure according to claim 1, wherein the continuous wall of the helicoidal rib is formed with constant width and height and formed to coil of the liner at least two times, so that the second cooling passage passes through the continuous wall of the helicoidal rib at least two times.

8. The helicoidal structure according to claim 1, wherein each of the plurality of cooling holes has a semi-circular shape.

9. A combustor for a gas turbine, comprising:
   a transition piece;
   a liner coupled with the transition piece;
   a flow sleeve configured to enclose a periphery of the transition piece and the liner; and
   a helicoidal rib including a continuous wall forming a first cooling passage along which main-cooling compressed air flows, the continuous wall comprising:
      an upper edge forming an upper junction with an inner circumferential surface of the flow sleeve,
      a lower edge forming a lower junction with an outer circumferential surface of the liner, and
      a plurality of cooling holes formed in at least one of the upper and lower edges of the continuous wall, each of the plurality of cooling holes extending only part way from one of the upper and lower edges to the other of the upper and lower edges,
   wherein the helicoidal rib is configured to guide the main-cooling compressed air at a predetermined angle with respect to an axial direction of the liner, and
   wherein the plurality of cooling holes form a second cooling passage extending in the axial direction, the second cooling passage inducing a flow of an he auxiliary-cooling compressed air through the plurality of cooling holes, the flow of the auxiliary-cooling compressed air is derived from a flow of the main-cooling compressed air in the first cooling passage.

10. The combustor according to claim 9, wherein the plurality of cooling holes are formed in each of the upper and lower edges of the continuous wall of the helicoidal rib.

11. The combustor according to claim 10, wherein the plurality of cooling holes are alternately formed in the upper and lower edges of the continuous wall of the helicoidal rib along the axial direction.

12. The combustor according to claim 10, wherein the plurality of cooling holes are formed at misaligned positions in respective portions of the continuous wall of the helicoidal rib with respect to the axial direction.

13. The combustor according to claim 9, wherein the plurality of cooling holes are formed at positions spaced apart from each other by a predetermined distance along the continuous wall of the helicoidal rib.

14. The combustor according to claim 13, wherein the plurality of cooling holes are alternately formed in the upper and lower edges of the continuous wall of the helicoidal rib along the axial direction.

15. The combustor according to claim 9, wherein the continuous wall of the helicoidal rib is formed with constant width and height and formed to coil of the liner at least two times, so that the second cooling passage passes through the continuous wall of the helicoidal rib at least two times.

16. The combustor according to claim 9, wherein each of the plurality of cooling holes has a semi-circular shape.

17. A gas turbine for generating power, comprising a combustor comprising:
　a transition piece;
　a liner coupled with the transition piece;
　a flow sleeve configured to enclose a periphery of the transition piece and the liner; and
　a helicoidal rib including a continuous wall forming a first cooling passage along which main-cooling compressed air flows, the continuous wall comprising:
　　an upper edge forming an upper junction with an inner circumferential surface of the flow sleeve,
　　a lower edge forming a lower junction with an outer circumferential surface of the liner, and
　　a plurality of cooling holes formed in at least one of the upper and lower edges of the continuous wall, each of the plurality of cooling holes extending only part way from one of the upper and lower edges to the other of the upper and lower edges,
　wherein the helicoidal rib is configured to guide the main-cooling compressed air at a predetermined angle with respect to an axial direction of the liner, and
　wherein the plurality of cooling holes form a second cooling passage extending in the axial direction, the second cooling passage inducing a flow of an auxiliary-cooling compressed air through the plurality of cooling holes, the flow of the auxiliary-cooling compressed air is derived from a flow of the main-cooling compressed air in the first cooling passage.

18. The gas turbine according to claim 17, wherein the plurality of cooling holes are formed in each of the upper and lower edges of the continuous wall of the helicoidal rib.

19. The gas turbine according to claim 18, wherein the plurality of cooling holes are alternately formed in the upper and lower edges of the continuous wall of the helicoidal rib along the axial direction.

20. The gas turbine according to claim 18, wherein the plurality of cooling holes are formed at misaligned positions in respective portions of the continuous wall of the helicoidal rib with respect to the axial direction.

* * * * *